US009894136B2

(12) United States Patent
Gupta et al.

(10) Patent No.: US 9,894,136 B2
(45) Date of Patent: *Feb. 13, 2018

(54) GENERATING A DOMAIN NAME FOR EACH MEMBER IN A GROUP USING A SOCIAL GRAPH OR CONTACT INFORMATION

(71) Applicant: Go Daddy Operating Company, LLC, Scottsdale, AZ (US)

(72) Inventors: Nitin Gupta, Mountain View, CA (US); Tapan Kamdar, San Jose, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 183 days.

This patent is subject to a terminal disclaimer.

(21) Appl. No.: 14/815,798

(22) Filed: Jul. 31, 2015

(65) Prior Publication Data

US 2017/0034118 A1     Feb. 2, 2017

(51) Int. Cl.
*H04L 29/08*     (2006.01)
*H04L 12/26*     (2006.01)
*H04L 29/12*     (2006.01)

(52) U.S. Cl.
CPC ............ *H04L 67/02* (2013.01); *H04L 43/045* (2013.01); *H04L 61/3025* (2013.01); *H04L 61/302* (2013.01)

(58) Field of Classification Search
CPC ... H04L 67/02; H04L 43/045; H04L 61/3025; H04L 61/302

USPC ......................................................... 709/223
See application file for complete search history.

(56) References Cited

U.S. PATENT DOCUMENTS

| 2011/0196935 | A1 | 8/2011 | Rideout et al. |
| 2013/0212200 | A1* | 8/2013 | Dennis .................... H04L 51/22 709/206 |
| 2015/0256499 | A1 | 9/2015 | Kumar et al. |
| 2016/0179769 | A1* | 6/2016 | Gershom .......... G06F 17/30345 715/235 |

* cited by examiner

*Primary Examiner* — David Lazaro
*Assistant Examiner* — Zia Khurshid
(74) *Attorney, Agent, or Firm* — Quarles & Brady LLP

(57) ABSTRACT

A domain name customer may connect to a domain name registrar website. The domain name registrar may determine a social media platform that is used by the domain name customer. The domain name registrar, with permission from the domain name customer, may receive a social graph from the social media platform and/or contact information from a client device of the domain name customer. The domain name registrar may parse the social graph and/or contact information looking for groups, such as family members or employees of the same company, and for all the members in the group. The domain name registrar may create a unique user name or domain name for each member in the group, preferably following a standard template or format. The domain name customer may add, remove or select the domain names for registration. If an email account is purchased or activated by the domain name customer, the domain name registrar may, using a similar process, create a unique email address for each member in the group.

18 Claims, 14 Drawing Sheets

GENERATING A DOMAIN NAME FOR EACH MEMBER IN A GROUP USING A SOCIAL GRAPH OR CONTACT INFORMATION

FIELD OF THE INVENTION

The present invention generally relates to methods of generating a domain name, a user name or an email address for each member in a group using a social graph from a social media platform and/or contact information from a client device.

SUMMARY OF THE INVENTION

The present invention provides methods for generating a domain name, a user name, a social identity or an email address for each member in a group using a social graph from a social media platform or contact information from a client device. A social graph may be, as non-limiting examples, any relationship graph or hierarchical organizational graph.

In one embodiment, a domain name registrar may receive on a registrar website, a third party website partially powered by the domain name registrar or an application on a client device a domain name customer. The domain name customer may be using a client device and be a member of a group. The domain name registrar may determine a social media platform having a customer account created for the domain name customer and/or contact information of the domain name customer. The domain name registrar may download or receive a social graph (which could be a relationship graph, e.g., American Bar Association member list, political party member list, etc.) from the social media platform associated with the customer account and a contact information from the client device. In some embodiments, the domain name registrar may perform a server call and receive a part of the social graph (relationship=immediate family, etc.). The social graph and contact information may include, as an example, a plurality of names and a relationship of each name in the plurality of names with the domain name customer. The domain name registrar may parse the social graph and/or contact information to determine a plurality of groups and a plurality of members in each group. Each member in the plurality of members in the group preferably shares a common attribute (such as belonging to the same immediate family, employees of the same business or members of the same social organization). The domain name registrar or the domain name customer may select one of the groups for processing. The domain name registrar may create a unique identifier or a user name (which may be used on one or more social media platforms) for each member in the plurality of members in the group. The domain name registrar may generate a plurality of suggested domain names by combining the unique identifier for each member in the plurality of members in the group with a top-level domain. The domain name registrar may display the plurality of suggested domain names to the domain name customer for possible domain name registration on the registrar website.

In another embodiment, a registrar website may be used to receive by a domain name registrar a domain name registrant. The domain name registrant may be using a client device and be a member of a group. The domain name registrar may register a domain name and create an email account for the domain name registrant. The domain name registrar may determine a social media platform comprising a customer account created for the domain name registrant. Alternatively, or in addition, the domain name registrar may receive contact information of the domain name customer from the client device, either via an application on the client device, software on the registrar website or by any other desired method. The domain name registrar may download a social graph from the social media platform associated with the customer account and/or contact information from the client device. The social graph and contact information may comprise a plurality of names and a relationship of each name in the plurality of names with the domain name registrant. The domain name registrar may parse the social graph and/or contact information to determine a plurality of members in the group. Each member in the plurality of members in the group preferably shares a common attribute. The domain name registrar may create a unique identifier for each member in the plurality of members in the group. The domain name registrar may generate a plurality of email addresses by combining from left to right the unique identifier for each member in the plurality of members, an "@" symbol and the domain name. The domain name registrar may display the plurality of email addresses to the domain name registrant on the registrar website. If accepted by the domain name registrant, the domain name registrar may set-up an email account using the generated email addresses for each member in the plurality of members in the group. A message with a link may be sent to each member in the plurality of members using the social media platform. The link may direct the member to a webpage for a one-time set-up of the email account.

The above features and advantages of the present invention will be better understood from the following detailed description taken in conjunction with the accompanying drawings.

DETAILED DESCRIPTION

Figure 1:
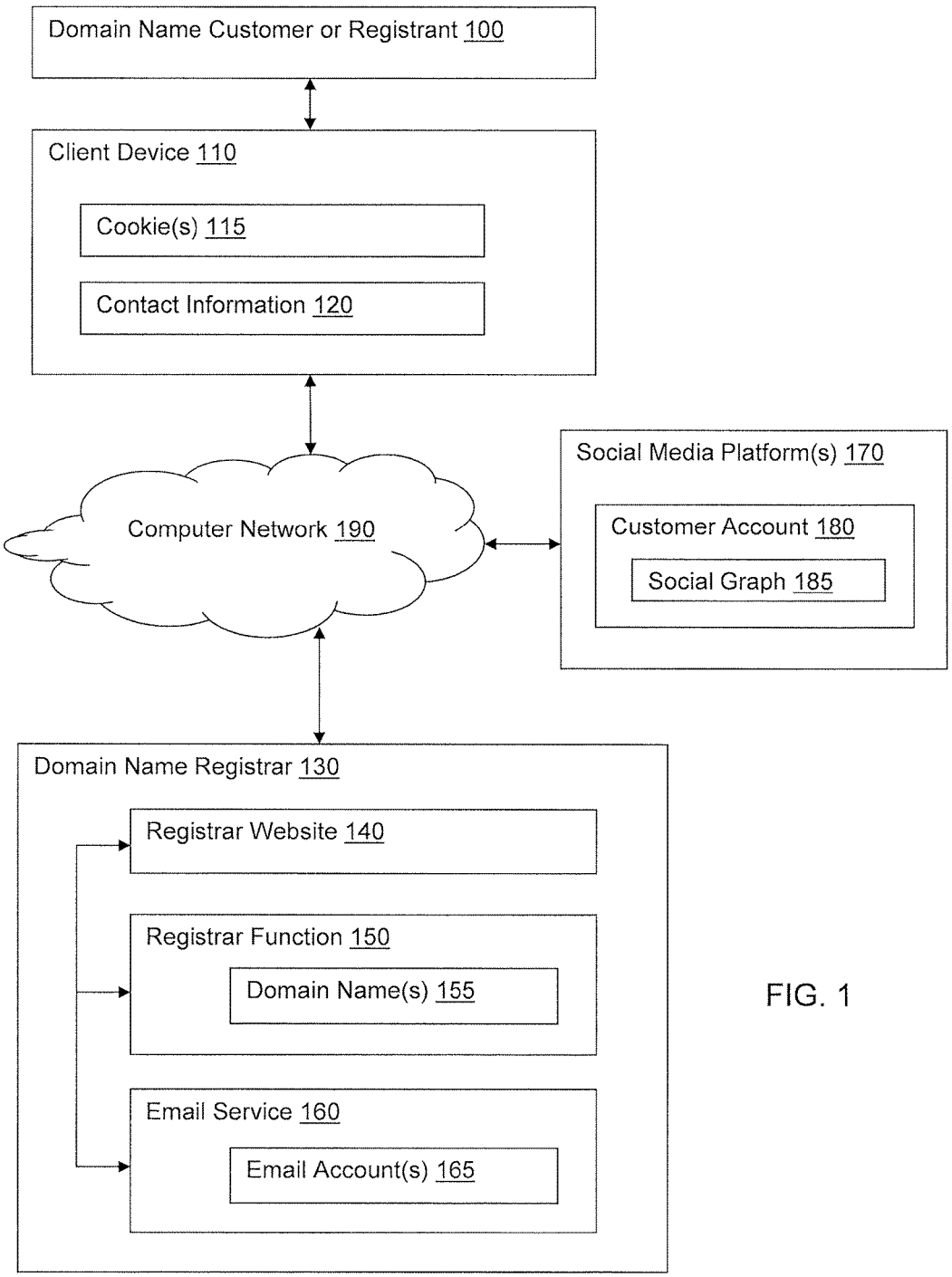
FIG. 1 is a block diagram of a system that may be used to practice the present invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system that may be used to practice the present invention. A computer network 190 is a collection of links and nodes (e.g., multiple computers and/or other devices connected together) arranged so that information may be passed from one part of the computer network 190 to another over multiple links and through various nodes. Non-limiting examples of a computer network 190 include the Internet, public switched telephone network, global Telex network, intranets, extranets, local-area networks, wide-area networks, wired networks, wireless networks and/or any combination thereof.

The Internet is a worldwide network of computers, hardware servers, computer software and computer networks arranged to allow for the easy and robust exchange of information between computer users on client devices 110, hardware server(s) that may host websites and/or files. Hundreds of millions of people around the world have access to client devices 110 connected to the Internet via an Internet Service Provider (ISP). Businesses and content providers may place multimedia information (e.g., text, graphics, audio, video, animation, and other forms of data) at specific locations on the Internet referred to as a website. The combination of all the websites and their corresponding web pages on the Internet is generally known as the World Wide Web (WWW) or simply the Web.

For Internet users and businesses alike, the Internet continues to be increasingly valuable. Internet users (people) use the Web for many everyday tasks. As non-limiting examples, Internet users engage in social networking, shopping, banking, paying bills and/or consuming media and entertainment. E-commerce is growing, with businesses delivering more services and content across the Internet and Internet users communicating and collaborating online.

Prevalent on the Web are multimedia websites, some of which may offer and sell goods and services to individuals and organizations. Websites may consist of a single webpage, but typically consist of multiple interconnected and related webpages. Websites, unless very large and complex or have unusual traffic demands, may reside on a single server and are prepared and maintained by a single individual or entity, although websites may reside on multiple servers too. Menus, links, tabs, etc. may be used by the Internet user to move between different web pages within the website or to move to a totally different website.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER, MOZILLA FIREFOX or SAFARI. After the browser has located the desired webpage, it requests and receives information from the webpage, typically in the form of an HTML document, and then displays the webpage content for the Internet user on the client device 110. The Internet user may then view other webpages at the same website or move to an entirely different website using their browser running on their client device 110.

Some businesses, typically those that are larger and more sophisticated, may provide their own hardware, software, and connections to the Internet to create their Internet presence. However, many Internet users either do not have the resources available or do not want to create and maintain the infrastructure necessary to host their own websites. To assist such businesses, hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The browser, by accessing particular files on the Internet or by caching the information, is able to convert a URL into an IP address. The URL may include a Hypertext Transfer Protocol (HTTP) request combined with the website's Internet address, also known as the website's domain name 155. An example of a URL with a HTTP request and domain name 155 is: http://www.companyname.com. In this example, the "http" identifies the URL as a HTTP request and the "companyname.com" is the domain name 155.

Domain names 155 are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names 155 within a TLD and their corresponding IP addresses. For certain TLDs (e.g., .biz, .info, .name, and .org) the Registry is also the authoritative source for contact information related to the domain name 155 and is referred to as a "thick" Registry. For other TLDs (e.g., .com and .net) only the domain name 155, registrar identification, and name server information is stored within the Registry, and a Registrar 130 is the authoritative source for the contact information related to the domain name 155. Such Registries are referred to as "thin" registries. Most gTLDs are organized through a central domain name Shared Registration System (SRS) based on their TLD. TLDs may also be referred to as domain name extensions.

The process for registering a domain name 155 with .com, .net, .org, and some other TLD allows an Internet user to use an ICANN-accredited Registrar 130 to register their domain name 155. An Internet user that has registered a domain name 155 is referred to as the domain name registrant 100 of the domain name 155. An Internet user that may register a domain name 155 in the future may be referred to as a domain name customer 100 before the domain name 155 is actually registered to the Internet user.

If a domain name customer 100 wishes to register the domain name 155 "mycompany.com," the domain name customer 100 may initially determine whether the desired domain name 155 is available by connecting to a website (a registrar website 140) of a domain name registrar 130. The domain name customer 100 may make this contact using a registrar website 140 and typing the desired domain name 155 into a field on the registrar website 140 created for this purpose.

Upon receiving the domain name availability request from the Internet user, the domain name registrar 130 may ascertain whether "mycompany.com" has already been registered by checking the SRS database associated with the TLD of the domain name 155, by checking with the Registry or by checking downloaded zone files. The results of the search may then be displayed on the domain name registrar website 140 to thereby notify the domain name customer 100 of the availability of the domain name 155. If the domain name 155 is available, the domain name customer 100 may proceed with the registration process of the domain name 155. If the domain name 155 is not available for registration, the domain name customer 100 may keep selecting alternative domain names until an available domain name is found for domain name registration.

The registrar website 140 may have a plurality of webpages. The registrar website 140 may be hosted or operated from one or more servers. The one or more servers are hereby defined to be electrical machines. The servers may be, as non-limiting examples, one or more Dell PowerEdge(s) rack server(s), HP Blade Servers, IBM Rack or Tower servers, although other types of servers, combinations of one or more servers, may also be used. In preferred embodiments, software and/or applications may be run on the servers to programmatically (using computer software) automate all the discussed steps, processes and methods, i.e., all of the steps, process and methods described herein are performed without human intervention unless human intervention or human action is specifically described.

The registrar website 140 may have one or more display fields as well as one or more data entry fields. The display fields may be used to display data to the domain name customer 100 on the registrar website 140 while data entry fields may be used to receive data entered by the domain name customer 100 into the registrar website 140.

One or more registries may be connected to the computer network 190, which is preferably the Internet, so that the registries' functions may be easily accessed by electronic commands from the domain name registrar 130. The registries may determine if one or more domain names 155 are available for registration and register one or more domain names 155 to the domain name customer or registrant 100 in conjunction with the domain name registrar 130.

A domain name customer or registrant 100 will typically be a person trying to register one or more domain names 155. The domain name customer or registrant 100 may use a client device 110, such as, as non-limiting examples, a cell phone, PDA, tablet, laptop computer, or desktop computer to access a registrar website 140 via a computer network 190, such as the Internet.

Email Service

In some embodiments of the present invention, an email service 160 may be performed by a domain name registrar 130 that provides email hosting. The domain name registrar 130 may operate and comprise the email service 160. The email service 160 itself may comprise one or more email servers to send, receive, accept, and store emails for other organizations and/or end users. The email service 160 may work with desktop email software, such as, as non-limiting examples, Microsoft Outlook and Mozilla Thunderbird.

Alternatively, the email service 160 may be part of a webmail or online email system (or the email service 160 may handle both desktop email software and online email). This enables users to send, receive, store and review e-mail from Internet users' Internet browsers. When logging into an email service 160, users simply enter the email service URL in their browser's address or location field, and use their webmail account by typing in a username and password. Some of the more popular online email services 160 are Go Daddy Workspace Email, Yahoo! Mail, Gmail, Hotmail and AOL Mail.

Social Media Platform

A social media platform 170 may be a website or online presence operated by a social media provider. The social media platform 170 comprises a plurality of servers and other electrical mechanical devices. The social media platform 170 may allow a plurality of users of the social media platform 170 to each obtain a customer account 180. A user of the social media platform 170 may share information, such as, as non-limiting examples, text, pictures, video and/or audio with other users via the social media platform 170. Active links may also be shared in the shared information to allow other users of the social media platform to be easily directed to different websites. The social media platform 170 may have the capability of allowing users to select one or more people (typically other users of the social media platform 170) that may and may not receive the shared information posted on the customer account 180. As non-limiting examples, the social media platform 170 may be Facebook, Facebook Messenger, Line, WhatsApp, Twitter, LinkedIn, Pinterest, Google Plus+, Tumbler, Instagram, VK, Flickr, Vine, Meetup, Tagged, Ask.fm, MeetMe, ClassMates, any messaging based networks and/or any database or flat file provided by a client application which may provide a list of members, e.g., an online directory list of members.

To assist in managing the distribution of information, the social media platform 170 may request, prompt and/or receive data from a user of the social media platform 170, regarding people that are, in some manner, connected to the user. The data may comprise, as non-limiting examples, the names (first, middle and/or last) of other people connected to the domain name customer or registrant 100, their relationship (as non-limiting examples, father, mother, sister, brother, daughter, son, friend, work associate, member of an organization with the user, etc.) to the domain name customer or registrant 100 or to each other, their phone number(s), their address(es), the names of companies they work for and/or the social or professional organizations they belong to. Not all the data listed above is required for a social graph 185 and the social graph 185 may comprise additional data.

To organize the data regarding people connected to the user of the social media platform 170, the social media platform 170 may store all or part of this data and possibly metadata in a social graph 185. The user of the social media platform 170 will typically have easy access to all of the data regarding people connected to the user and be able to add, delete and/or edit this data as desired.

Table I is a non-limiting example of a social graph 185 that includes data and metadata from a user account that may have been stored at a social media platform 170. A third party, such as a domain name registrar 130, may be able to download, i.e., receive this data, preferably with the permission or authentication from a domain name customer or registrant 100 who is the user of the social media platform 170. Once downloaded by the domain name registrar 130, the domain name registrar 130 may parse, i.e., analyze, the social graph 185 (data regarding people that are associated with the domain name customer or registrant 100) to identify one or more groups in the data and to identify the members within each group. The parsing may be customized for each social media platform 170 as each social media platform 170 likely stores its social graphs in the same format for every user of the social media platform 170. The domain name registrar 130 may also save the relationship data to determine who to grant administrative privileges to, such as all or one or more of the members of the group.

TABLE I

FQL: SELECT profile_id, name, relationship FROM family WHERE profile_id=me( )
{ "data": [
{"profile_id": "123456789", "name": "Marry Jones", "relationship": "family member" },
{"profile_id": "123456789", "name": "Manny Monroe", "relationship": "cousin"},
{"profile_id": "123456789", "name": "John Pratt", "relationship": "brother-in-law"},
{"profile_id": "123456789", "name": "Steve Tomkin", "relationship": "family member"},
{"profile_id": "123456789", "name": "Amy Kirsten", "relationship": "wife"},
{"profile_id": "123456789", "name": "Victoria Kirsten", "relationship": "sister-in-law"},
{"profile_id": "123456789", "name": "Anna Kirsten", "relationship": "mother"},
{"profile_id": "123456789", "name": "Paul Smith", "relationship": "nephew" }, ] }

When Table I is parsed, it may be determined that the "profile-id" is "123456789." In this example, the profile-id may be a user account number for the user account of the social media platform 170. The domain name registrar 130 may also determine that "Marry Jones" is a "family member," "Manny Monroe" is a "cousin," "John Pratt" is a "brother-in-law," "Steve Tomkin" is a "family member," "Amy Kirsten" is a "wife," "Victoria Kirsten" is a "sister-in-law," "Anna Kirsten" is a "mother" and "Paul Smith" is a "nephew" of the user of the social media platform 170.

In the present invention, a domain name customer or registrant 100 may be a user of one or more social media platforms 170 and have a customer account 180. The domain name customer or registrant 100 may have a customer account 180, with a different social graph 185, with one or more social media platforms 170.

Determining which Social Media Platform(s) are Relevant

It may be desirable in the present invention for a domain name registrar 130 to be able to determine one or more social media platforms 170 used by a domain name customer or registrant 100. The domain name registrar 130 may determine the one or more social media platforms 170, comprising a customer account 180 created for the domain name customer or registrant 100, using any desired method.

As one method to determine a social media platform 170 used by a domain name customer or registrant 100, the domain name registrar 130 may determine a location, possibly from the IP address, user specified or GPS/location information provided by a client device 110, of the domain name customer or registrant 100. Certain social media platforms 170 are more popular in some areas than in other areas. Knowing the location of the domain name customer or registrant 100 can steer the domain name registrar 130 towards the one or more social media platforms 170 used by the domain name customer or registrant 100. Specifically, if a domain name customer or registrant 100 is located where a particular social media platform 170 is known to be popular, the domain name registrar 130 may check the particular social media platform 170 for membership of the domain name customer or registrant 100 before checking social media platforms for membership of the domain name customer or registrant 100 that are not as popular where the domain name customer or registrant 100 is located. The domain name registrar 130 may also use the information gathered from the social media platform 170 and correlate the information with publicly available information or account information held by the domain name registrar 130 (if any of the related domain name customer or registrant 100 are also customers of the domain name registrar 130) to gather additional pieces of information (e.g., profession) to build better name suggestions. As a non-limiting example, a domain name customer or registrant 100 named Paul Smith might be a doctor whose domain name or email identity could be prefixed with "Dr".

Figure 11:
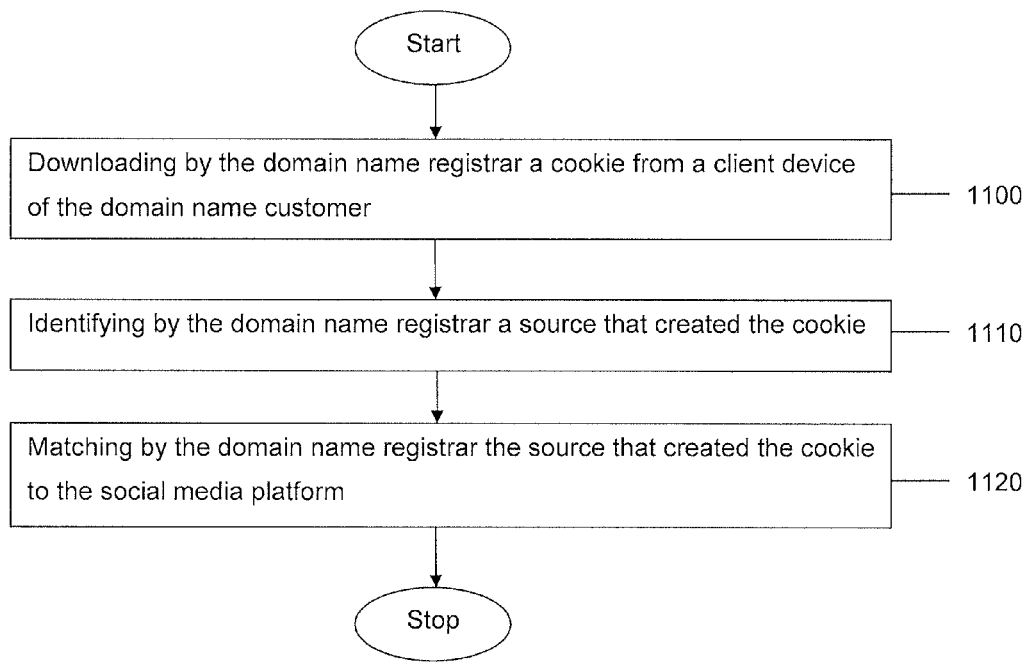
FIG. 11 is a flow chart diagram that illustrate an example embodiment of steps that may be performed to determine a social media platform used by a domain name customer or registrant.

FIG. 11 is a flow chart diagram that illustrate an example embodiment of a method that may be performed to determine a social media platform 170 used by a domain name customer or registrant 100. The domain name registrar 130 may download, i.e., receive a cookie 115 from a client device 110 of the domain name customer or registrant 100. (Step 1100) The domain name registrar 130 may identify, possibly by comparing a text in the cookie 115 to known texts in cookies from different known sources (the sources may be different social media platforms). (Step 1110) The domain name registrar 130 may match the source that created the cookie 115 with different social media platforms 170. (Step 1120) This method may work because social media platforms 170 often store cookies 115 that may be associated with the social media platform 170 on the client device 110 of the user of the social media platform 170. These cookies 115 may contain data that allow the domain name registrar 130 to determine that the domain name customer or registrant 100 has used the social media platform 170.

Figure 12:
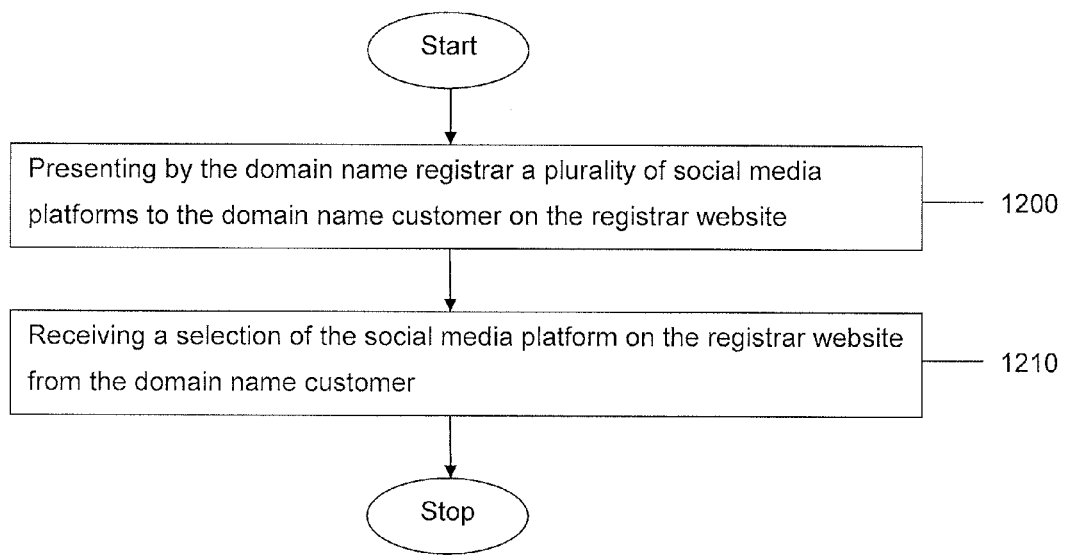
FIG. 12 is a flow chart diagram that illustrates an example embodiment of steps that may be performed to determine a social media platform used by a domain name customer or registrant.

FIG. 12 is a flow chart diagram that illustrate an example embodiment of another method that may be performed to determine a social media platform 170 used by a domain name customer or registrant 100. In this method the domain name registrar 130 may present a plurality of social media platforms, preferably via icons or trademarks of the social media platforms, to the domain name customer or registrant 100 on the registrar website 140. (Step 1200) The domain name registrar 130 may receive a selection from the domain name customer or registrant 100 of the social media platform 170 used by the domain name customer or registrant 100 on the registrar website 140. (Step 1210)

Obtaining Data from a Social Media Platform or Client Device

For a third party, such as a domain name registrar 130, to receive the social graph 185 (or any other personal information in the user account), the user of the account preferably (and may have to) authorizes the release of the social graph 185 and/or authenticate the third party.

A third party, such as a domain name registrar 130, may also collect contact information 120 from a client device 110 of the domain name customer or registrant 100 using any desired method. As a non-limiting example, the contact information 120 may be communicated to a registrar website 140 of the domain name registrar 130 from the client device 110 of the domain name customer or registrant 100. As another non-limiting example, an application on the client device 100 of the domain name customer or registrant 100 communicates the contact information to the domain name registrar 130. In preferred embodiments, the domain name customer or registrant 100 gives permission, possibly through the operating system of the client device 110), for the domain name registrar 130 to collect the contact information 120.

In the present invention, the third party receiving the social graph 185 of a user of the social media platform 170 or the contact information 120 from a client device 110 of the domain name customer or registrant 100 may be a domain name registrar 130.

Determining Group(s) for a Domain Name Customer or Registrant

It may be desirable in the present invention for a domain name registrar 130 to identify one or more groups with the domain name customer or registrant 100 as a member of the group. The domain name registrar 130 may determine the one or more groups using any desired method or combination of methods. As a non-limiting example, the social media platform 170 may have one or more predefined groups. The domain name registrar 130 may receive from the social media platform 170 the one or more predefined groups and the one or more members in each predefined group. As another non-limiting example, the domain name registrar 130 may parse a social graph 185 received from a social media platform 170 and/or contact information 120 received from a client device 110 to determine a group or a plurality of groups with the domain name customer or registrant 100 as a member. Each group may have a plurality of members and each member in the plurality of members in each group preferably share a common attribute that defines the group. Example common attributes may be to belong to the same immediate family (defined however desired), such as the Jones family, be employees of the same company or members of the same organization, such as, as non-limiting examples, a fraternity, a sorority, a private club or a social organization.

An example of a group that may be identified is family members within a predetermined degree of relatedness. As an example, a spouse and children may be part of a family group, while others more distantly related are not members of the family group. The parsed data from the social graph 185 or contact information 120 may be used to identify metadata that defines the accepted members of the group (such as "wife" as the metadata thereby identifying a member that is the wife of the domain name customer or registrant 100). The parsed data may be used to identify individuals with the same last name to identify family members. The parsed data may be used to find individuals with the same address which could be used to identify closely related individuals. All family members of a desired relatedness that are found may be members of the group.

Another example of a group that may be identified is employees that work at the same company as the domain name customer or registrant 100. The parsed data of a social graph 185 or contact information 120 from the client device 110 (which may be a cell phone) may be searched for information that would identify one or more employees that work at the same company (assuming this information is used by the domain name customer or registrant 100 with the social media platform 170 or used in the contact information 120 of the client device). All employees that work at the same company may be members of a group.

Another example of a group that may be identified is alumni of a university or members of a private organization. Once again, the data from the social graph 185 or contact information 120 may be parsed to find a plurality of members in a group of alumni of a university or a plurality of members in a group of members of a private organization. All alumni may be members of a group and all members of a private organization may be members of another group.

The found groups are likely to be different depending on the focus of the social media platform 170 or types of data stored in the client device 110. As non-limiting examples, Facebook may be good for finding groups of family members while LinkedIn may be good for finding groups of employees that all work for the same company. Online group directories, like Yahoo Groups, Groupspaces, BigTent, etc. may also be used to find groups connected with a single purpose. The same parsed data used to find the one or more groups that have the domain name customer or registrant 100 as a member may also be used by the domain name registrar 130 to identify a plurality of members in each found group.

Creating a Unique Identifier for Each Member in a Group

It may be desirable in the present invention for a domain name registrar 130 to create a unique identifier for each member in an identified and/or selected group. Any desired method of creating a unique identifier may be used.

Figure 13:
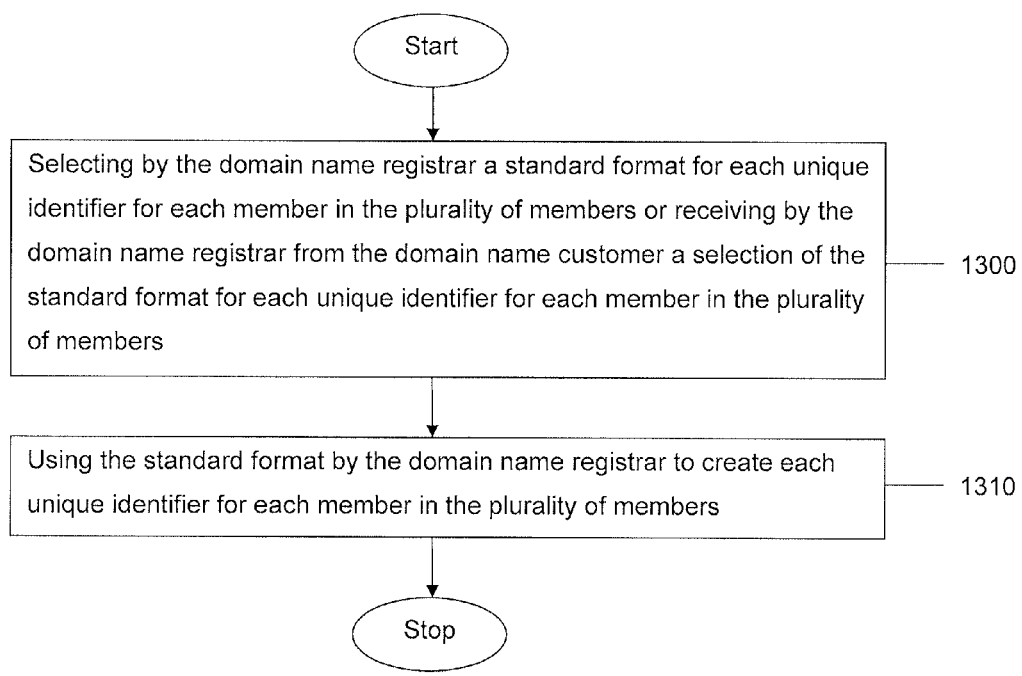
FIG. 13 is a flow chart diagram that illustrates an example embodiment of steps that may be performed to create a unique identifier for each member in a group.

FIG. 13 is a flow chart diagram that illustrates an example embodiment of a method that may be performed to create a unique identifier for each member in a group. The domain name registrar 130 may select a standard format for each unique identifier for each member in the plurality of members or the domain name registrar 130 may receive from the domain name customer or registrant 100 a selection of the standard format for each unique identifier for each member in the plurality of members. (Step 1300) Any desired standard format may be used. As non-limiting examples, the standard format may be a first name combined with a last name, a first initial combined with a last name, a last name combined with a first name or a first initial combined with a last name combined with a term describing the group. Additional examples of standard formats (or templates) are: 1) "The"+Last Name+Family; 2) "The"+Last Name+"s"; 3) Last name+Family; and 4) Last Name+"s". As a specific example of the template comprising a first initial ("B") combined with a last name ("Smith") combined with a term describing the group ("BikeClub") may be "BSmithBikeClub."

The domain name registrar 130 may use a standard format to create each unique identifier for each member in the plurality of members. As an example, a standard format of a first initial with a last name may be used to turn a social graph 185 data or contact information 120 of "Bob Smith" into a unique identifier of "BSmith." This process may be repeated for all members in the group. (Step 1310)

In some embodiments, if a selected standard format does not yield unique identifiers for each member in the group, then a new standard format may be selected. As an example, if "Brian Smith" and "Bob Smith" are members of the same group, using the standard format of first initial and a last name would generate a unique identifier of "BSmith" for both "Brian Smith" and "Bob Smith." In such cases, a different standard format, such as using the first name and last names, may be tried. In this case, using the first name and last names as the standard format would generate the acceptable unique identifiers of "BrianSmith" and "BobSmith." Another example may be to use allowed punctuations like "." and "+" in email IDs, e.g., "Bob.Smith" even if the domain name was "bobsmith.nyc" resulting in an email address of "Bob.Smith@bobsmith.nyc."

As previously stated, the unique identifier must be unique compared to the other unique identifiers for the other members within the group. In addition, for domain names 155, a unique identifier must be unique within the group and produce a domain name 155 that is available. If a unique identifier produces a domain name that is not available, a new standard format may be selected that produces both unique identifiers within the group and also produces domain names 155 that are available. Any number of different standard formats may be tried until every unique identifier for every member in the group is both unique compared to the other members in the group and every unique identifier produces an available domain name 155. This preferred method creates a plurality of unique identifiers that look similar to each other and all follow a standard format making the plurality of unique identifiers easier to remember by the members of the group.

As the unique identifiers are to be used to build domain names 155 and/or email addresses, spaces are preferably removed and are not made part of a standard format as valid domain names 155 and valid email addresses cannot contain spaces. For similar reasons, characters that cannot be used in valid domain names 155 or valid email addresses should also be removed from any generated unique identifiers. Also, since domain names 155 and email addresses do not treat capital letters and small letters different, a capital letter and a small letter of the same letter may be treated as the same letter.

Figure 14:
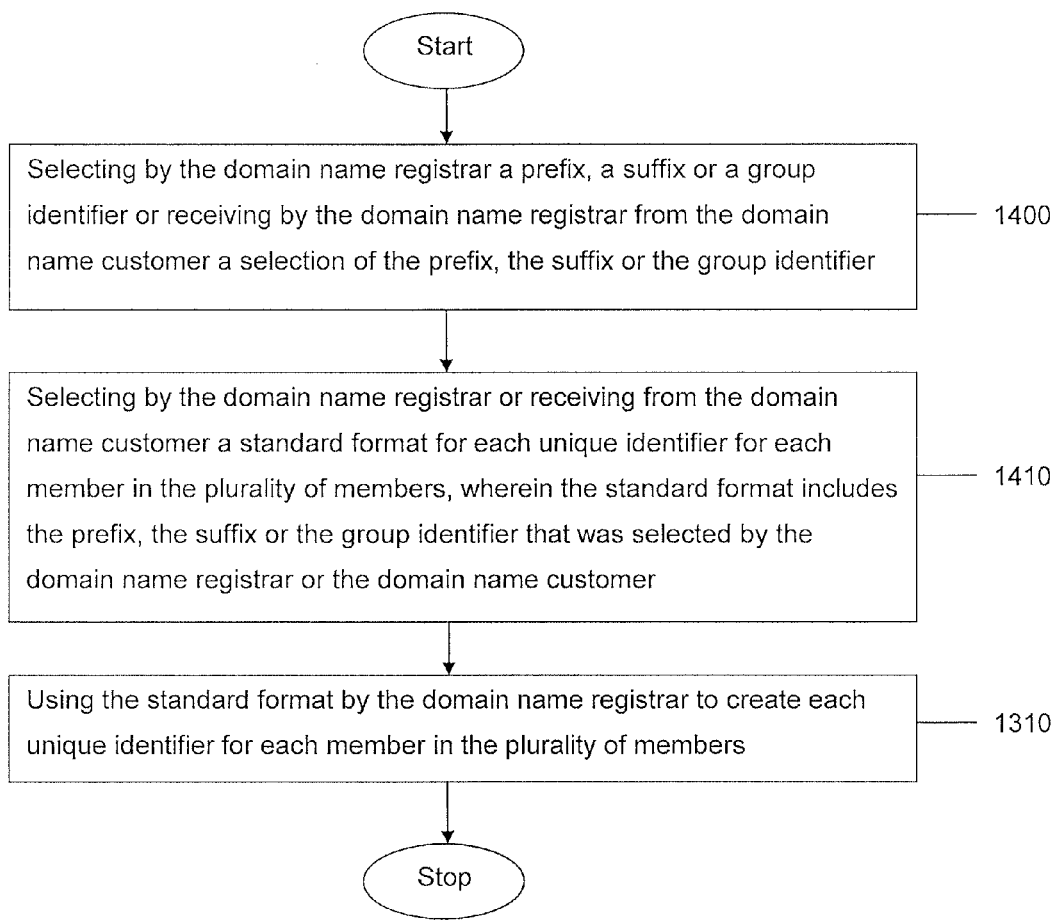
FIG. 14 is a flow chart diagram that illustrates an example embodiment of steps that may be performed to create a unique identifier for each member in a group.

FIG. 14 is a flow chart diagram that illustrates an example embodiment of a method that may be performed to create a unique identifier for each member in a group. In this embodiment the domain name registrar 130 may select a prefix, a suffix or a group identifier or the domain name registrar 130 may receive from the domain name customer or registrant 100 a selected prefix, a suffix or a group identifier. The prefix, suffix and group identifier may be any word, group of words, abbreviations or any other character string. A prefix may be appended before the unique identifier, a suffix may be appended after the unique identifier and the group identifier may be appended either before, after or within the unique identifier. An example prefix could be "The" or "A," an example suffix could be "NYC," or "Arizona." As a non-limiting example, a group identifier may be "family" if all the members in the group are in a family. An example group identifier may be "GoDaddy" if all the members in the group are employees of "GoDaddy." Another example group identifier may be "California" if all the members in the group live in California.

In some embodiments, the domain name registrar 130 may select a standard format for each unique identifier for each member in the plurality of members, wherein the standard format includes the prefix, the suffix or the group identifier that was selected by the domain name registrar 130 or the domain name customer or registrant 100. (Step 1410) As a non-limiting example, the standard format may be a first initial of a name, a last name and a group identifier. Thus, if the first initial is "B," if the last name is "Smith" and if the group identifier is "GoDaddy," then the unique identifier would be "BSmithGoDaddy." In preferred embodiments, the same standard format is used for all the plurality of members in the group. (Step 1310) Thus, unique identifiers of "MJonesGoDaddy," "CSmithGoDaddy" and "KJohnsonGoDaddy" may be created using the same standard format. As previously mentioned, different standard formats may be used until all of the unique identifiers are actually unique while following the same standard format.

Domain Names

Figure 2:
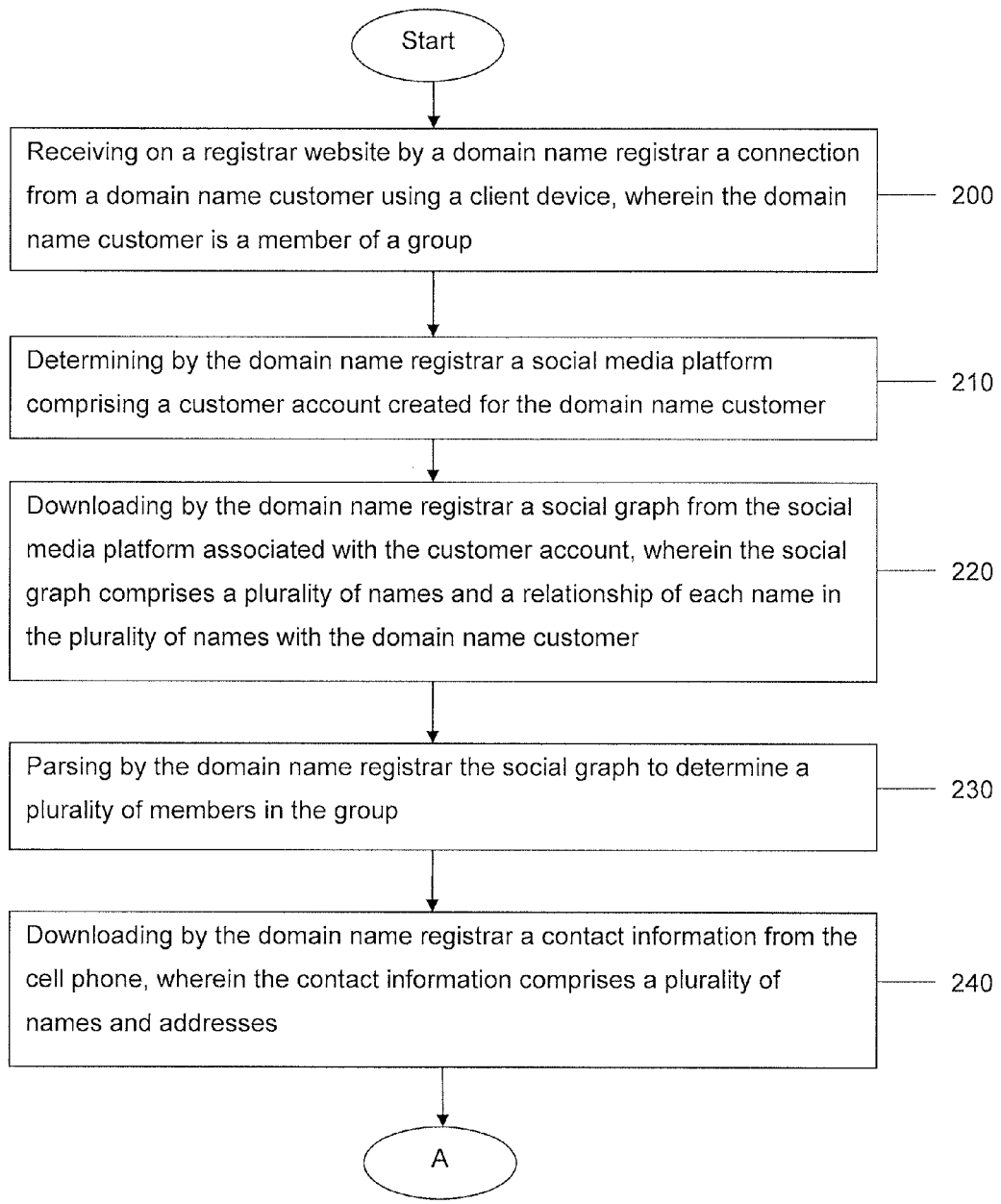
FIGS. 2 and 3 are flow chart diagrams that illustrate an example embodiment of the invention for generating a domain name for each member in a group using a social graph from a social media platform and contact information from a client device.
Figure 3:
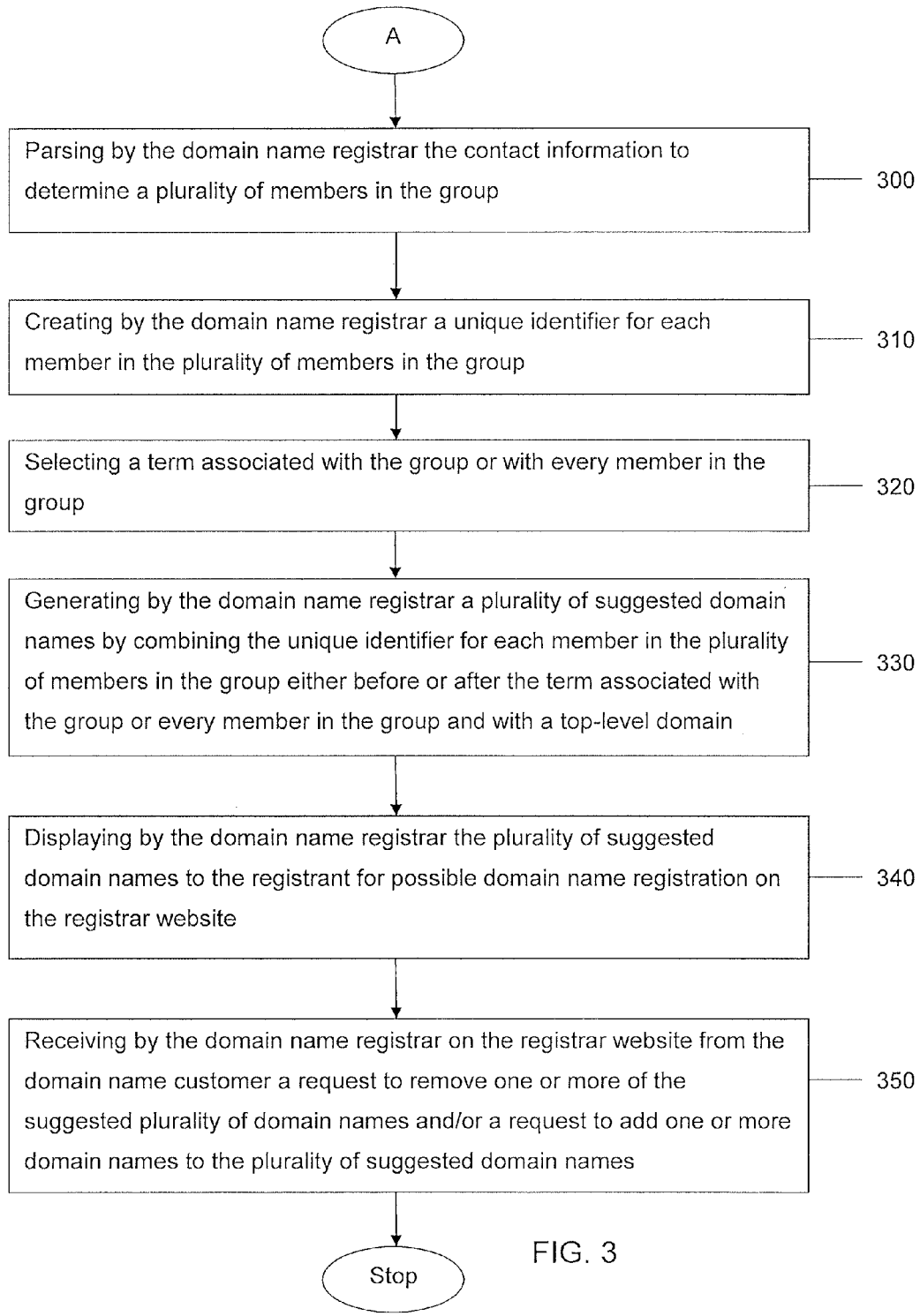
Figure 4:
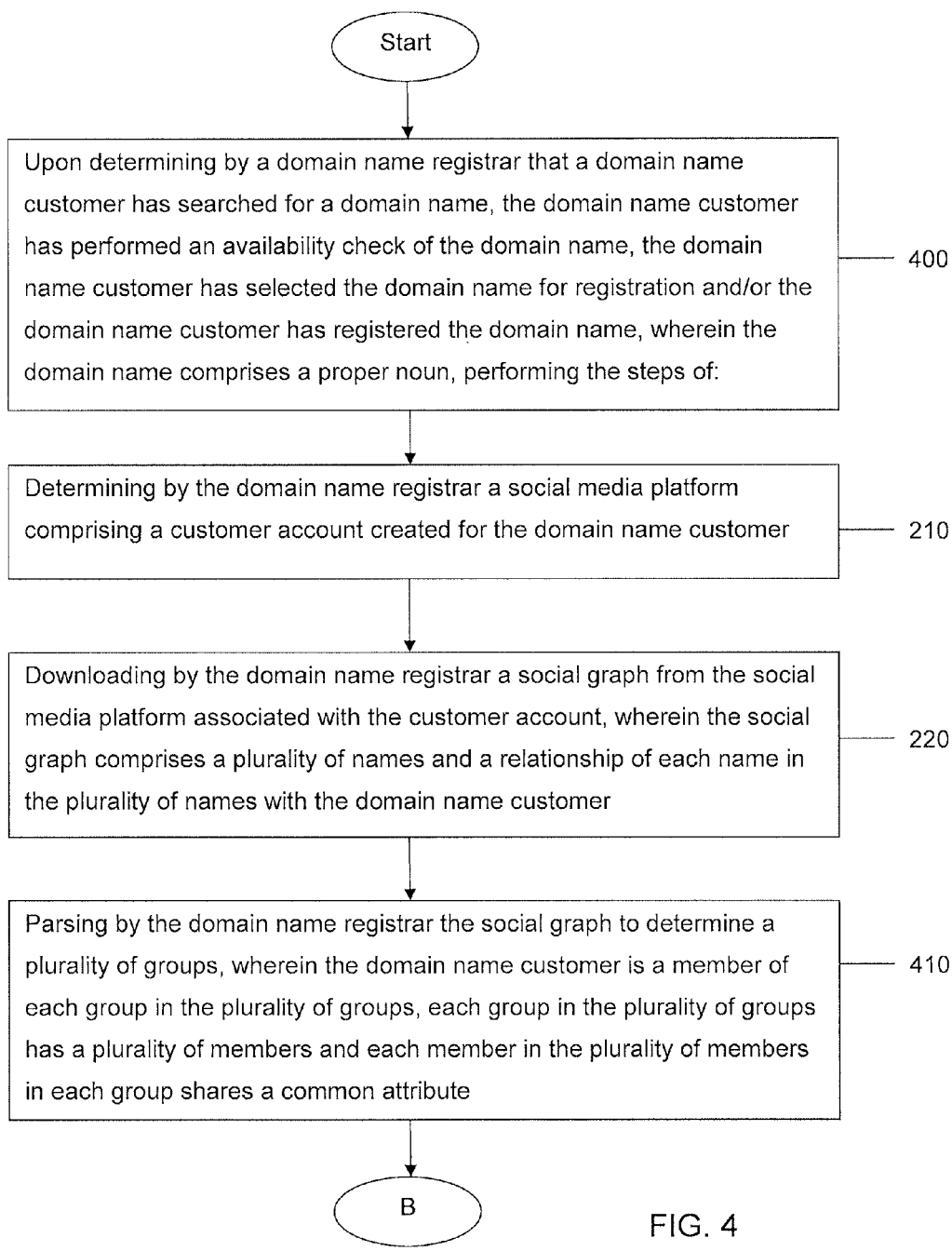
FIGS. 4 and 5 are flow chart diagrams that illustrate an example embodiment of the invention for generating a domain name for each member in a group using a social graph from a social media platform.
Figure 5:
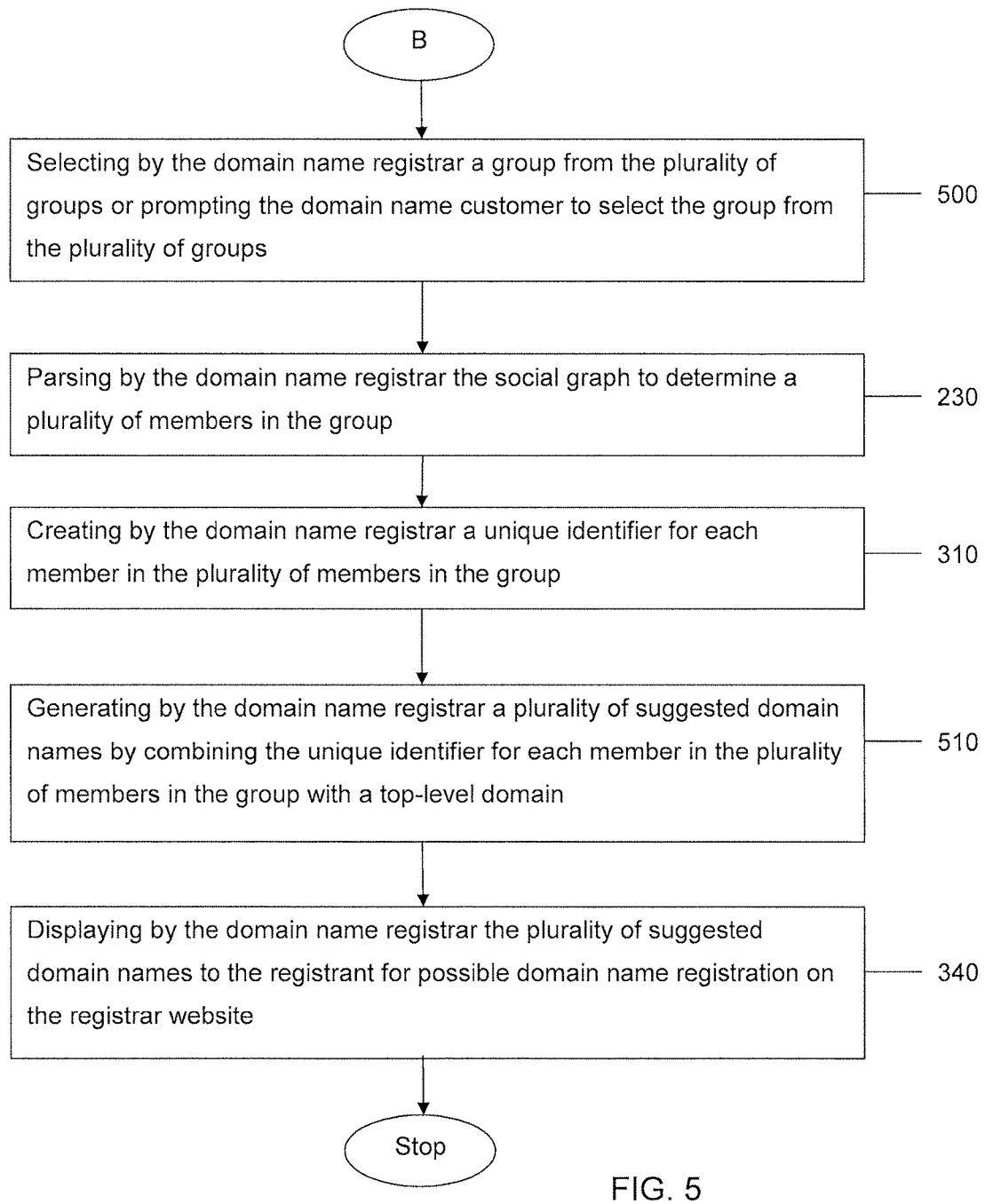
Figure 6:
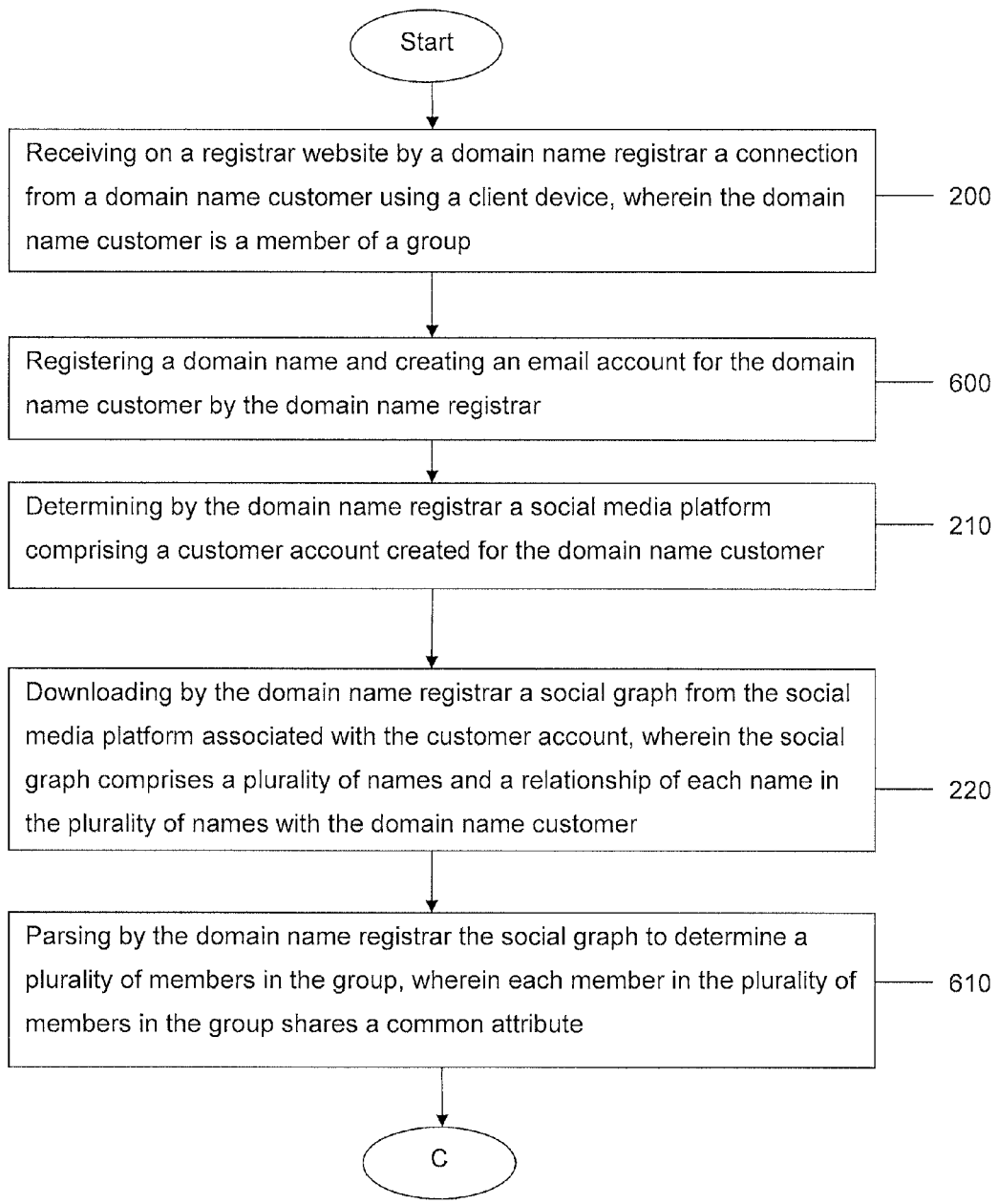
FIGS. 6 and 7 are flow chart diagrams that illustrate an example embodiment of the invention for generating an email address for each member in a group using a social graph from a social media platform.
Figure 7:
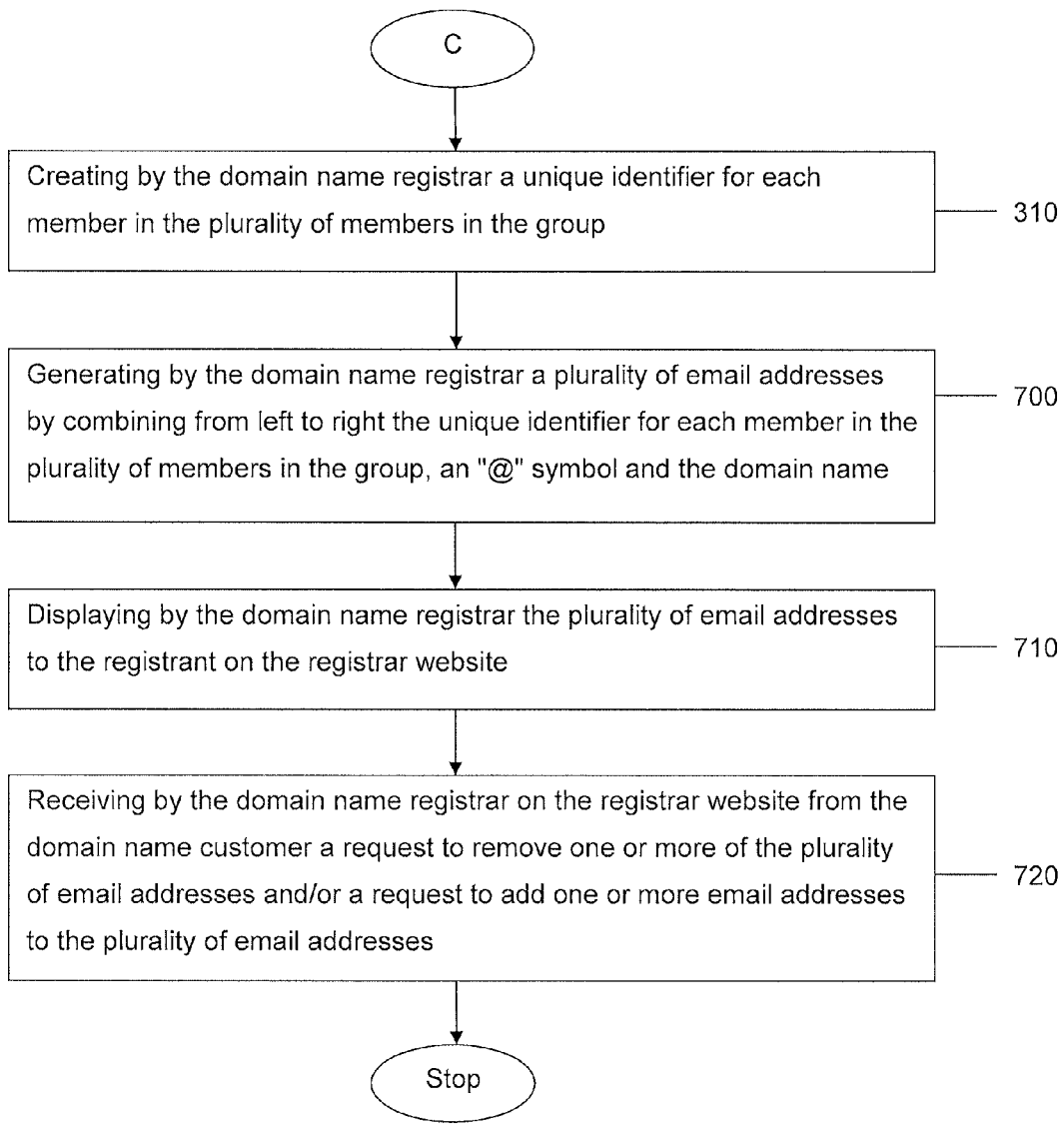
Figure 8:
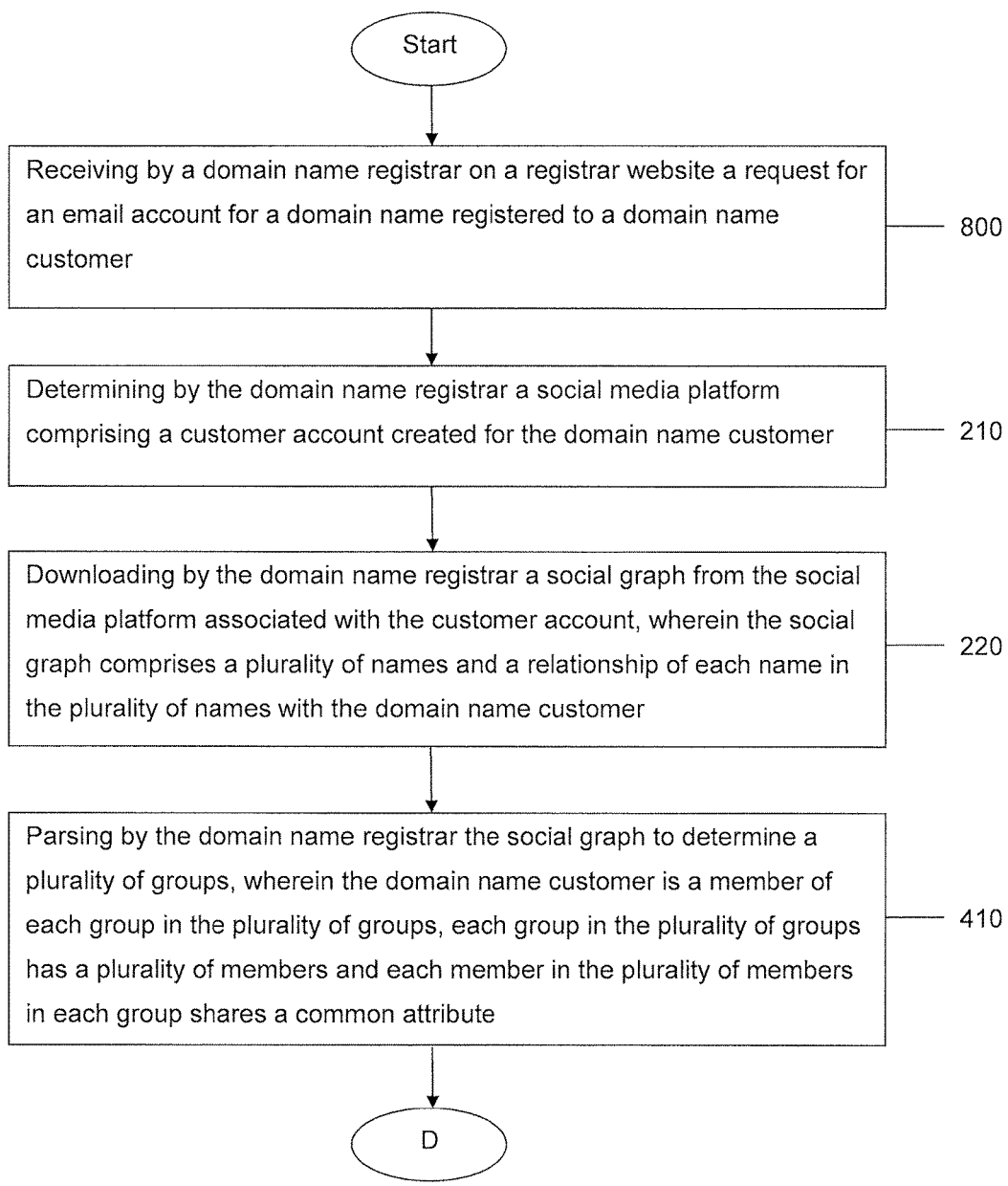
FIGS. 8-10 are flow chart diagrams that illustrate an example embodiment of the invention for generating an email address for each member in a group using a social graph from a social media platform and contact information from a client device.
Figure 9:
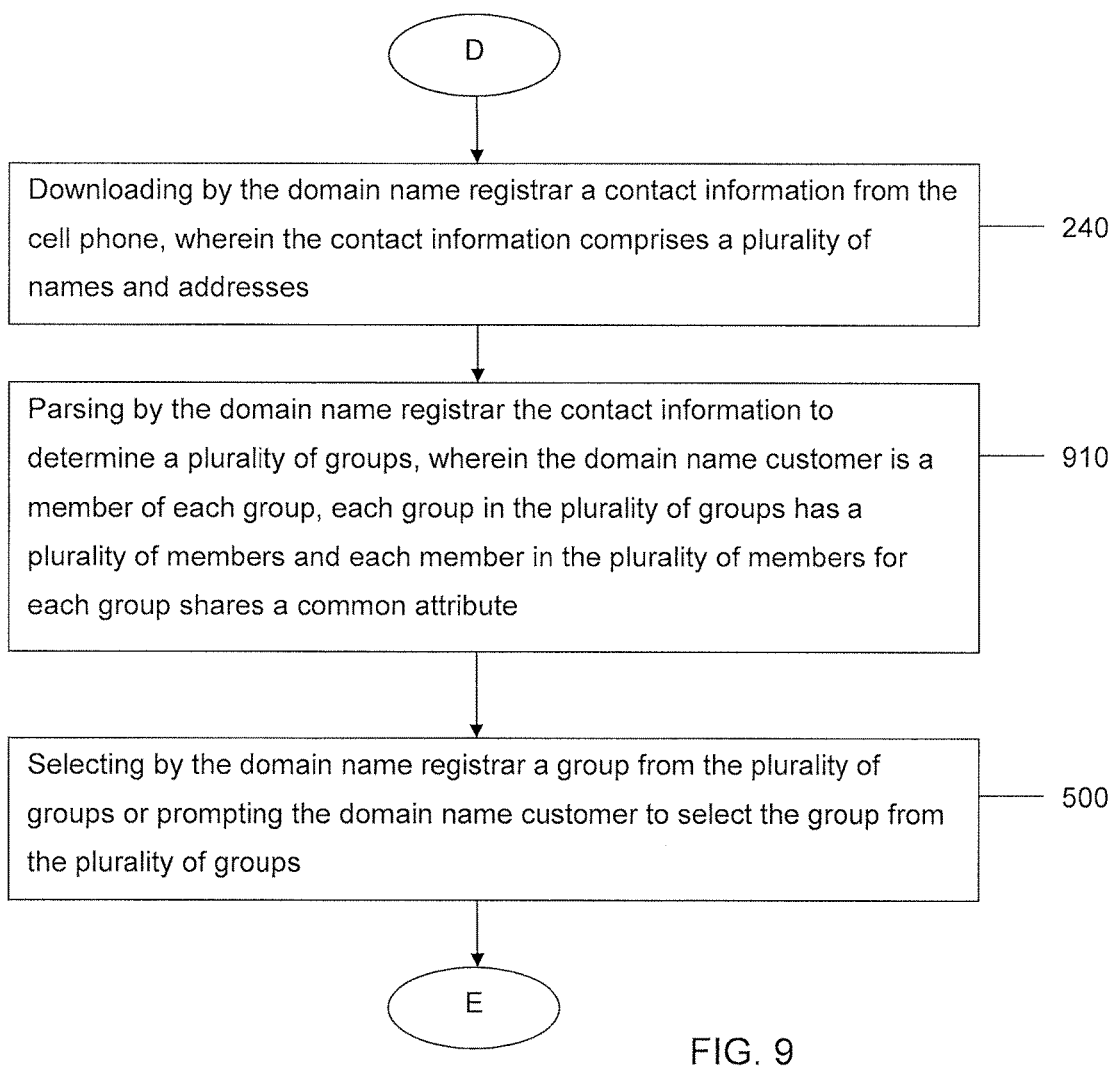
Figure 10:
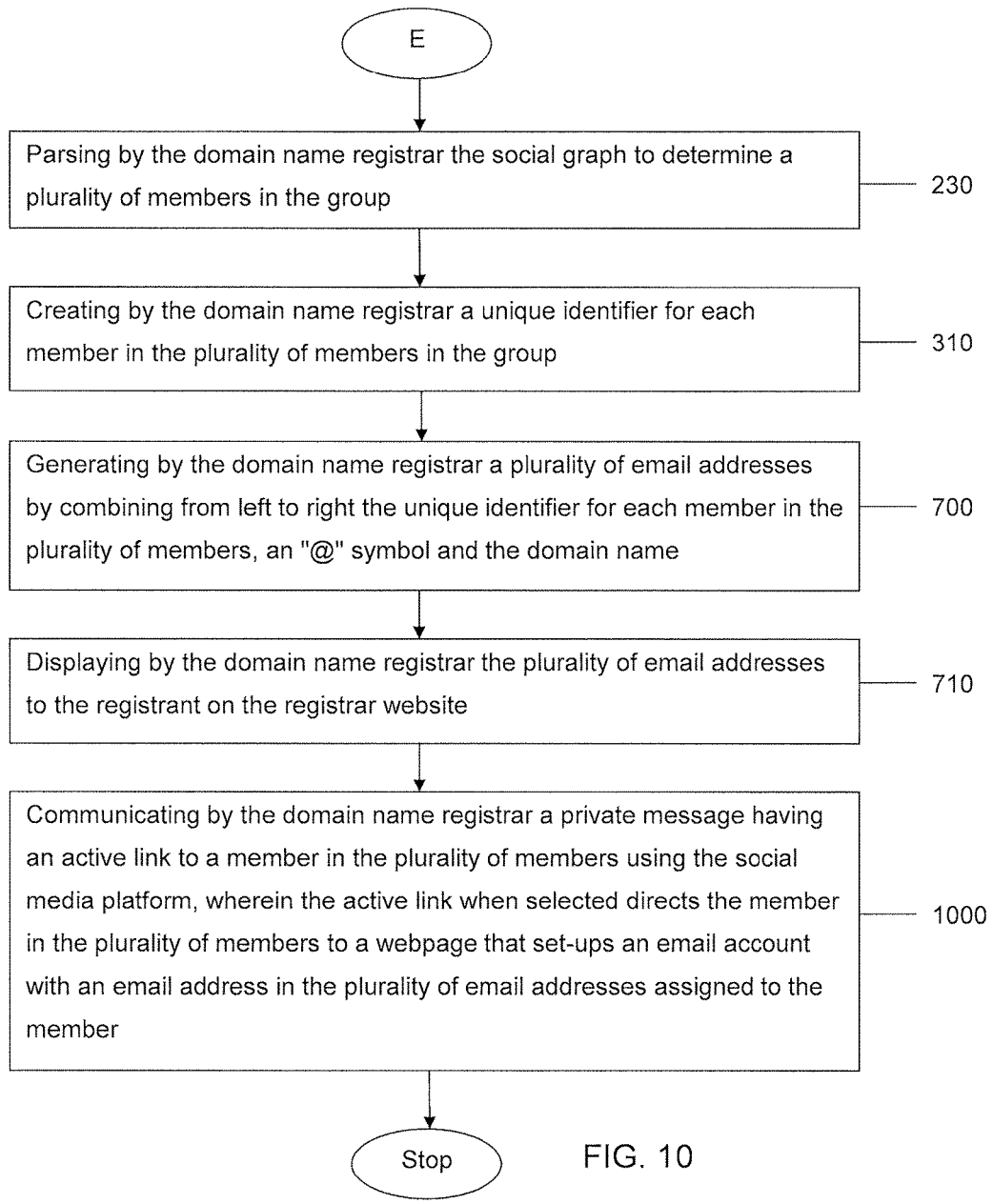

FIGS. 2-4 are flow chart diagrams that illustrate two example embodiment of the invention. The invention may generate a plurality of suggested domain names 155 that may be registered by the domain name customer 100 on the registrar website 140 using a registrar function 150 of the domain name registrar 130.

A domain name registrar 130 using a registrar website 140 may receive an Internet connection from a domain name customer 100. In other words, the registrar website 140 may receive the domain name customer 100. The domain name customer 100 may use a browser running on a client device 110 to connect to the registrar website 140. (Step 200)

The domain name registrar 130 may generate and display a plurality of suggested domain names 155 to the domain name customer 100 at any time. However, there are preferred times that are more appropriate than other times for generating and displaying a plurality of suggested domain names 155 to the domain name customer 100.

As non-limiting examples, the preferred times to start generating and displaying suggested domain names 155 to a domain name customer 100 are when 1) the domain name customer 100 is searching for a domain name on the registrar website 140, 2) the domain name customer 100 is searching for a domain name comprising a proper noun on the registrar website 140, 3) the domain name customer 100 has entered a domain name on the registrar website 140 for an availability check, 4) the domain name customer 100 has entered a domain name comprising a proper noun on the registrar website 140 for an availability check, 5) the domain name customer 100 has selected a domain name for registration on the registrar website 140, 6) the domain name customer 100 has selected a domain name comprising a proper noun for registration on the registrar website 140, 7) the domain name customer 100 has registered a domain name on the registrar website 140 and 8) the domain name customer 100 has registered a domain name comprising a proper noun on the registrar website 140. (Step 400)

In some embodiments, the remaining steps in the invention are not performed until at least one of the eight preferred times to start is detected. A proper noun, and especially a name of a person, in a domain name entered by the domain name customer or registrant 100 may be used to indicate (and thus trigger further action) that the domain name customer or registrant 100 is interested in a plurality of domain names 155, one for each person or member in a group of people.

The domain name registrar 130 may determine one or more social media platforms 170 used by the domain name customer 100. The social media platform 170 may comprise a customer account 180 created for the domain name customer 100 by the social media platform 170. (Step 210)

The domain name registrar 130 may download, i.e., receive a social graph 185 from the social media platform 170 associated with the customer account 180. (Step 220) The social graph 185 may include, as non-limiting examples, a plurality of names, family relationship information for the plurality of names (typically with respect to the domain name customer 100), one or more companies associated with each name, social organizations for each name, clubs for each name, addresses for each name, telephone number(s) for each name and educational institutions for each name. These types of data for a social graph 185 are only examples and social media platforms 170 may include all, none or different data from the data described in these examples.

In some embodiments, the domain name registrar 130 may parse the social graph 185 to determine a plurality of groups where the domain name customer 100 is a member of each group. Preferably, all members in a group share a common attribute, connection or close relationship. As non-limiting examples, all immediate family members may be in a group and all employees of a business may be in a group. (Step 410) When a plurality of groups have been determined, the domain name registrar 130 may select one or more of the groups to use. Alternatively, the domain name registrar 130 may prompt the domain name customer 100 to select one or more of the groups to use. (Step 500)

The domain name registrar 130 may parse the social graph 185 to determine a plurality of members in the group. (Step 230) The domain name registrar 130 may have previously received sample data from various social media platforms 170 so that the domain name registrar 130 may already know where the names of members in the group are likely to be found in the social graph 185 to assist in the parsing processes.

The domain name registrar 130 may download or receive contact information 120 from a client device 110 associated with the domain name customer 100 using any desired method. The contact information 120 may include names, addresses and phone numbers for one or more members in a group. (Step 240) The area codes of the phone numbers may be used to help determine geographical locations of members in the group. As an example, a member with a telephone number (602) 123-4567 has an area code of (602) which would indicate that the member lives in Arizona, and most likely lives in Phoenix, Ariz.

A social graph 185 from a social media platform 170 and/or a contact information 120 from a client device 110 may be received by the domain name registrar 130. However, in other embodiments, only the social graph 185 or only the contact information 120 is received by the domain name registrar and used. In yet other embodiments, additional social graphs from other social media platforms may be received and/or additional contact information 120 from other client devices may be received by the domain name registrar The data from the additional social graphs and/or additional contact information 120 may also be parsed to determine one or more groups and to determine the one or more members within each group.

The domain name registrar 130 may parse the contact information 120 to determine a plurality of members in the group. (Step 300) In some embodiments, the domain name registrar 130 may combine one or more social graphs from one or more social media platforms 170 with contact information 120 from one or more client devices all associated with the domain name customer 100. By combining social graphs and contact information 120 from multiple sources, it is less likely that one or more groups or one or more members in a group will be missed.

In some embodiments, the domain name registrar 130 may select a standard format to use or the domain name registrar 130 may prompt the domain name customer 100 with a plurality of standard formats and receive a selected standard format from the domain name customer 100. The standard format may be, as non-limiting examples, a first initial with a last name, a first name with a last name or a first initial, a last name and a generic term (such as a company name, like "GoDaddy"). In preferred embodiments, all unique identifiers follow the same standard format so that all created suggested domain names 155 have a similar look and pattern making the suggested domain names 155 easier to remember if registered by the domain name registrar 130 and used by the members in the group.

The domain name registrar 130 may create a unique identifier for each member in the plurality of members in the group. (Step 310) The domain name registrar 130 may generate a plurality of suggested domain names 155 by combining the unique identifier for each member in the plurality of members with the same top-level domain (Step 510)

As an example, unique identifiers of "BobSmith," "MarkSmith" and "KimSmith" may be created as previously described. A same top-level domain of ".com" may be selected by the domain name registrar 130 or by the domain name customer 100. A standard format of a unique identifier and a TLD may be selected by the domain name registrar 130 or by the domain name customer 100. This example would then generate a plurality of suggested domain names 155 of "BobSmith.com," "MarkSmith.com" and "KimSmith.com." (Step 510)

In some embodiments, the selected TLD, which is preferably the same for all suggested domain names 155 for a group, may be selected based on the group. As non-limiting examples, if all members in a family group live in New York, N.Y., the TLD of ".nyc" may be selected or if all members in the group are attorneys, the TLD of ".attorney" may be selected. This further customizes the suggested domain names 155 to the group.

In some embodiments, the domain name registrar 130 may create a unique identifier for each member in the plurality of members in the group and use the unique identifier as a second-level domain. As an example, unique identifiers of "BobSmith," "MarkSmith" and "KimSmith" may be created as previously described. A domain name 155 of "domainname.com" may be suggested or already registered to the domain name customer 100. A standard format of a unique identifier combined with a domain name 155 may be selected by the domain name registrar 130 or by the domain name customer 100. This example would then generate a plurality of suggested domain names 155 of "BobSmith.domainname.com," "MarkSmith.domainname.com" and "KimSmith.domainname.com."

In some embodiments, the domain name registrar 130 may select a term associated with the group or with every member in the group. Alternatively, the domain name registrar 130 may list one or more terms associated with the group or with ever member in the group found by the domain name registrar 130 and prompt the domain name customer 100 to select one or more of the terms. The domain name registrar 130 may receive the one or more terms and use the one or more terms in the remaining steps. (Step 320)

The domain name registrar 130 may generate a plurality of suggested domain names 155 by combining the unique identifier for each member in the plurality of members either before or after the term associated with every member in the group or the group and with a same top-level domain. (Step 330)

As an example, unique identifiers of "BobSmith," "MarkSmith" and "KimSmith" may be created as previously described. The term associated with the group may be "Family" and a same top-level domain of ".com" may be selected by the domain name registrar 130 or by the domain name customer 100. A standard format of a unique identifier, a term associated with the group and a TLD may be selected by the domain name registrar 130 or by the domain name customer 100. This example would then generate a plurality of suggested domain names 155 of "BobSmithFamily.com," "MarkSmithFamily.com" and "KimSmithFamily.com."

The domain name registrar 130 may display the plurality of suggested domain names 155 to the domain name customer 100 for possible domain name registration on the registrar website 140. (Step 340) The domain name registrar 130 may receive on the registrar website 140 from the domain name customer 100 a request to remove one or more of the plurality of suggested domain names 155, a request to add one or more domain names 155 to the plurality of suggested domain names 155 or a request to register one or more of the plurality of suggested domain names 155. (Step 350)

In preferred embodiments, all generated domain names 155 are checked for availability before displaying the domain names 155 to the domain name customer 100. Domain names 155 that are not available are not displayed and only domain names 155 that are available for domain name registration are displayed on the registrar website 140 to the domain name customer 100 for domain name registration.

The domain name customer 100 may then select one or more of the plurality of suggested domain names 155 for domain name registration. The domain name registrar 130 may then register the selected domain name(s) 155 in the plurality of suggested domain names 155 to the domain name customer 100.

Email Addresses

FIGS. 6-10 are flow chart diagrams that illustrate two more example embodiments of the invention. These embodiments of the invention may generate a plurality of suggested email addresses that may be used by a domain name customer 100 on the registrar website 140 using an email service 160 operated by the domain name registrar 130.

A domain name registrar 130 using a registrar website 140 may receive a connection from a domain name customer 100. The domain name customer 100 may use a client device 110 to connect to the registrar website 140 over a computer network 190, such as the Internet. The domain name customer 100 may be a member of a group. (Step 200)

The domain name registrar 130 may register a domain name 155 and create an email account 165 for the domain name customer 100 (who may now also be referred to as the domain name registrant 100). (Step 600) Creating an email account 165 may be used as a trigger to perform the following steps. Unless the email account 165 is created, in preferred embodiments, the following steps are not performed. (Step 800)

The domain name registrar 130 may determine one or more social media platforms 170 wherein each social' media platform 170 comprising a customer account 180 created for the domain name registrant 100. (Step 210) The one or more social media platforms 170 may be determined using any desired method, such as the methods previously described.

The domain name registrar 130 may download, i.e., receive, a social graph 185 from a social media platform 170 associated with a customer account 180 of the domain name registrant 100. The social graph 185 may comprise a plurality of names and a relationship of each name in the plurality of names with the domain name registrant 100 as well as other personal information of the domain name registrant 100 and the people corresponding to the names in the social graph 185. (Step 220)

The domain name registrar 130 may also determine one or more client devices 110 associated with the domain name registrant 100 having contact information 120 and download or receive the contact information 120 (Step 240) from the client devices 110. The contact information 120 may comprise names, addresses and phone numbers.

The domain name registrar 130 may parse one or more social graphs 185 from one or more social media platforms 170 and/or one or more contact information 120 from one or more client devices to determine one or more groups that the domain name customer 100 is a member. (Step 410 and Step 910) As a non-limiting example, everybody with the same address as the domain name customer 100 may be combined into a family group. As another example, everybody employed by the same business may be combined into a work group. The same may be done for other organizations, clubs and so on. The domain name registrar 130 may select one or more of the groups to use for further processing or the domain name registrar 130 may list the groups on the registrar website 140 and prompt the domain name registrant 100 to select one or more of the groups for further processing. (Step 500)

The domain name registrar 130 may also parse the one or more social graphs 185 and/or one or more contact information to determine a plurality of members in the group(s) and/or the selected group(s), wherein each member in the plurality of members in the group shares a common attribute. (Step 230)

The domain name registrar 130 may create a unique identifier for each member in the plurality of members in the group. (Step 310) The domain name registrar 130 may select a standard format for each of the unique identifiers in a group. Alternatively, the domain name registrar 130 may list one or more standard formats on the registrar website 140 for the domain name registrant 100 to select. As examples, a standard format may be a first initial of a first name followed by a last name or a first name followed by a last name. Preferably, all unique identifiers in a group follow the same standard format so that by the end of the method, all the generated email addresses will have a similar looking format, making the email addresses easier to remember and more personalized to the group.

The domain name registrar 130 may generate a plurality of email addresses by combining from left to right the unique identifier for each member in the plurality of members in the group, an "@" symbol and the domain name 155. (Step 700) As examples, if the unique identifiers are "BSmith" and "JSmith," and the registered domain name 155 is "SmithFamily.com," the plurality of email addresses may be "BSmith@SmithFamily.com" and "JSmith@SmithFamily.com." While only two members were in this example group, any number of members may be in a group with each member having a corresponding unique email address that preferably follows a standard format of all other members in the group.

The domain name registrar 130 may display the plurality of email addresses to the domain name registrant 100 on the registrar website 140. (Step 710)

The domain name registrar 130 may receive a request on the registrar website 140 from the domain name registrant 100 to remove one or more of the plurality of email addresses or a request to add one or more email addresses to the plurality of email addresses. (Step 720) The domain name registrar 130 may comply with the request and only display the email addresses desired by the domain name registrant 100 by removing or adding email addresses.

After the domain name registrant 100 has accepted one or more of the plurality of email addresses for activation, the domain name registrar 130 may notify the plurality of members in the group by any desired communication method or combination of communication methods. As a non-limiting example, the domain name registrar 130 may communicate a private message having an active link to each member in the plurality of members in the group using one or more social media platforms 170. The private message sent to each member in the group may be used to notify the member of the new email account 165. The link in the message, when selected, may direct the member in the plurality of members to a webpage that sets-up an email account 165 for that member with an email address in the plurality of email addresses for that member in the group. (Step 1000) In another embodiment, an SMS message with the link (directing the member to the webpage that sets-up the email account) may be communicated to each member in the plurality of members. In some embodiments, a combination of methods (preferably based on the communication preference of each member in the group) may be used to notify each member in the plurality of members of their new email account.

In another embodiment, the domain name registrar 130 may send a plurality of welcome emails for each member in the group to an administrator's email account. The administrator may be, as preferred examples, the domain name registrant 100 or a person selected by the domain name registrant 100. Each welcome email may include a unique link. The administrator may forward the link or email to each member in the group via any desired communication method or methods. As non-limiting examples, the links may be sent via email, social network messages and/or SMS. On clicking or selecting the unique link, the member in the group may be asked a few confirmation questions to verify the member's identity. Questions may be created based on the social graph (which could be a relationship graph) or contact information previously received. Once confirmed, the member in the group may create a unique password and access the member's newly created email account as well as corresponding domain name.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

All processes and methods described herein, unless specifically stated otherwise, are hereby defined to be done automatically and without human intervention. This may be accomplished by programmatically performing all processes and methods described herein on one or more hardware servers that comprise electrical and mechanical components and computer software. While the hardware servers may run the computer software, the hardware servers are physical electrical mechanical devices and are not just or only computer software.

The invention claimed is:

1. A method, comprising the steps of:

upon determining by a domain name registrar that a domain name customer has searched for a domain name, the domain name customer has performed an availability check of the domain name, the domain name customer has selected the domain name for registration or the domain name customer has registered the domain name, performing the steps of:

determining by the domain name registrar a social media platform comprising a customer account created for the domain name customer;

downloading by the domain name registrar a social graph from the social media platform associated with the customer account, wherein the social graph comprises a plurality of names and a relationship of each name in the plurality of names with the domain name customer;

parsing by the domain name registrar the social graph to determine a plurality of groups, wherein the domain name customer is a member of each group in the plurality of groups, each group in the plurality of groups has a plurality of members and each member in the plurality of members in each group shares a common attribute;

selecting by the domain name registrar a group from the plurality of groups or prompting the domain name customer to select the group from the plurality of groups;

parsing by the domain name registrar the social graph to determine a plurality of members in the group;

creating by the domain name registrar a unique identifier for each member in the plurality of members in the group;

generating by the domain name registrar a plurality of suggested domain names by combining the unique identifier for each member in the plurality of members in the group with a same top-level domain;

displaying by the domain name registrar the plurality of suggested domain names to the domain name customer for possible domain name registration on the registrar website;

receiving by the domain name registrar a request from the domain name customer to registrar the plurality of suggested domain names; and registering by the domain name registrar the plurality of suggested domain names to the domain name customer.

2. The method of claim 1, wherein the determining by the domain name registrar the social media platform comprises the steps of:

downloading by the domain name registrar a cookie from a client device of the domain name customer;

identifying by the domain name registrar a source that created the cookie; and matching by the domain name registrar the source that created the cookie to the social media platform.

3. The method of claim 1, wherein the determining by the domain name registrar the social media platform comprises the steps of:

presenting by the domain name registrar a plurality of social media platforms to the domain name customer on the registrar website; and receiving a selection of the social media platform on the registrar website from the domain name customer.

4. The method of claim 1, further comprising the steps of:
downloading by the domain name registrar one or more additional social graphs from a one or more additional social media platforms; and
combining by the domain name registrar the one or more additional social graphs with the social graph.

5. The method of claim 1, wherein the creating by the domain name registrar the unique identifier for each member in the plurality of members in the group comprises the steps of:
selecting by the domain name registrar a standard format for each unique identifier for each member in the plurality of members or receiving by the domain name registrar from the domain name customer a selection of the standard format for each unique identifier for each member in the plurality of members; and
using the standard format by the domain name registrar to create each unique identifier for each member in the plurality of members.

6. The method of claim 1, wherein the domain name comprises a proper noun.

7. The method of claim 1, wherein the creating by the domain name registrar the unique identifier for each member in the plurality of members in the group comprises the steps of:
selecting by the domain name registrar a prefix, a suffix or a group identifier or receiving by the domain name registrar from the domain name customer a selection of the prefix, the suffix or the group identifier;
selecting by the domain name registrar or receiving from the domain name customer a standard format for each unique identifier for each member in the plurality of members, wherein the standard format includes the prefix, the suffix or the group identifier that was selected by the domain name registrar or the domain name customer; and
using the standard format by the domain name registrar to create each unique identifier for each member in the plurality of members.

8. A method, comprising the steps of:
upon determining by a domain name registrar that a domain name customer has searched for a domain name, the domain name customer has performed an availability check of the domain name, the domain name customer has selected the domain name for registration and/or the domain name customer has registered the domain name, performing the steps of:
receiving by the domain name registrar a contact information from a client device associated with the domain name customer, wherein the contact information comprises a plurality of names and addresses;
parsing by the domain name registrar the contact information to determine a plurality of groups, wherein the domain name customer is a member of each group, each group in the plurality of groups has a plurality of members and each member in the plurality of members for each group shares a common attribute;
selecting by the domain name registrar a group from the plurality of groups or prompting the domain name customer to select the group from the plurality of groups;
creating by the domain name registrar a unique identifier for each member in the plurality of members in the selected group;
generating by the domain name registrar a plurality of suggested domain names by combining the unique identifier for each member in the plurality of members in the selected group with a top-level domain;
displaying by the domain name registrar the plurality of suggested domain names to the domain name customer for domain name registration on the registrar website;
receiving by the domain name registrar a request from the domain name customer to registrar the plurality of suggested domain names; and
registering by the domain name registrar the plurality of suggested domain names to the domain name customer.

9. The method of claim 8, wherein the creating by the domain name registrar the unique identifier for each member in the plurality of members in the group comprises the steps of:
selecting by the domain name registrar a standard format for each unique identifier for each member in the plurality of members or receiving by the domain name registrar from the domain name customer a selection of the standard format for each unique identifier for each member in the plurality of members; and
using the standard format by the domain name registrar to create each unique identifier for each member in the plurality of members.

10. The method of claim 8, further comprising the step of:
receiving by the domain name registrar on the registrar website from the domain name customer a request to remove one or more of the suggested plurality of domain names or a request to add one or more domain names to the plurality of suggested domain names.

11. The method of claim 8, wherein the creating by the domain name registrar the unique identifier for each member in the plurality of members in the group comprises the steps of:
selecting by the domain name registrar a prefix, a suffix or a group identifier or receiving by the domain name registrar from the domain name customer a selection of the prefix, the suffix or the group identifier;
selecting by the domain name registrar or receiving from the domain name customer a standard format for each unique identifier for each member in the plurality of members, wherein the standard format includes the prefix, the suffix or the group identifier that was selected by the domain name registrar or the domain name customer; and
using the standard format by the domain name registrar to create each unique identifier for each member in the plurality of members.

12. A method comprising the steps of:
receiving on a registrar website by a domain name registrar a connection from a domain name customer using a client device, wherein the domain name customer is a member of a group;
determining by the domain name registrar a social media platform comprising a customer account created for the domain name customer;
downloading by the domain name registrar a social graph from the social media platform associated with the customer account, wherein the social graph comprises a plurality of names and a relationship of each name in the plurality of names with the domain name customer;
parsing by the domain name registrar the social graph to determine a plurality of members in the group, wherein the domain name customer is a member in the group;

creating by the domain name registrar a unique identifier for each member in the plurality of members in the group;

generating by the domain name registrar a plurality of suggested domain names by combining the unique identifier for each member in the plurality of members in the group with a top-level domain;

displaying by the domain name registrar the plurality of suggested domain names to the domain name customer for possible domain name registration on the registrar website;

receiving by the domain name registrar a request from the domain name customer to register the plurality of suggested domain names; and registering by the domain name registrar the plurality of suggested domain names to the domain name customer.

13. The method of claim 12, wherein the determining by the domain name registrar the social media platform comprises the steps of:

downloading by the domain name registrar a cookie from the client device of the domain name customer;

identifying by the domain name registrar a source that created the cookie; and matching by the domain name registrar the source that created the cookie to the social media platform.

14. The method of claim 12, wherein the determining by the domain name registrar the social media platform comprises the steps of:

presenting by the domain name registrar a plurality of social media platforms to the domain name customer on the registrar website; and receiving a selection of the social media platform on the registrar website from the domain name customer.

15. The method of claim 12, further comprising the steps of:

downloading by the domain name registrar additional social graphs from a plurality of social media platforms; and adding by the domain name registrar the additional social graphs to the social graph.

16. The method of claim 12, wherein the creating by the domain name registrar the unique identifier for each member in the plurality of members in the group comprises the steps of:

selecting by the domain name registrar a standard format for each unique identifier for each member in the plurality of members or receiving by the domain name registrar from the domain name customer a selection of the standard format for each unique identifier for each member in the plurality of members; and using the standard format by the domain name registrar to create each unique identifier for each member in the plurality of members.

17. The method of claim 12, further comprising the step of:

receiving by the domain name registrar on the registrar website from the domain name customer a request to remove one or more of the plurality of suggested domain names, a request to add one or more domain names to the plurality of suggested domain names or a request to register one or more of the plurality of suggested domain names.

18. The method of claim 12, wherein the creating by the domain name registrar the unique identifier for each member in the plurality of members in the group comprises the steps of:

selecting by the domain name registrar a prefix, a suffix or a group identifier or receiving by the domain name registrar from the domain name customer a selection of the prefix, the suffix or the group identifier;

selecting by the domain name registrar a standard format for each unique identifier for each member in the plurality of members, wherein the standard format includes the prefix, the suffix or the group identifier that was selected by the domain name registrar or the domain name customer; and using the standard format by the domain name registrar to create each unique identifier for each member in the plurality of members.

\* \* \* \* \*